(12) United States Patent
Wan

(10) Patent No.: US 11,361,409 B2
(45) Date of Patent: Jun. 14, 2022

(54) METHOD FOR SMOOTHING COORDINATES, TOUCH CHIP, AND ELECTRONIC TERMINAL

(71) Applicant: SHENZHEN GOODIX TECHNOLOGY CO., LTD., Shenzhen (CN)

(72) Inventor: Peng Wan, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 76 days.

(21) Appl. No.: 17/000,283

(22) Filed: Aug. 22, 2020

(65) Prior Publication Data

US 2020/0388012 A1 Dec. 10, 2020

Related U.S. Application Data

(63) Continuation of application No. PCT/CN2018/083715, filed on Apr. 19, 2018.

(51) Int. Cl.
*G06T 5/00* (2006.01)
*G06F 3/041* (2006.01)

(52) U.S. Cl.
CPC ............ *G06T 5/002* (2013.01); *G06F 3/0412* (2013.01); *G06F 3/0418* (2013.01)

(58) Field of Classification Search
CPC ..... G06T 5/002; G06F 3/0412; G06F 3/0418; G06F 3/041; G06F 17/17
See application file for complete search history.

(56) References Cited

U.S. PATENT DOCUMENTS

| 2015/0077420 | A1* | 3/2015 | Bolz | ................... | G06T 11/203 |
| | | | | | 345/442 |
| 2015/0325016 | A1 | 11/2015 | Carr et al. | | |
| 2016/0078649 | A1* | 3/2016 | Bonacina | ........... | G06K 9/00402 |
| | | | | | 345/442 |

(Continued)

FOREIGN PATENT DOCUMENTS

| CN | 102521856 A | 6/2012 |
| CN | 102521856 B | * 11/2013 |
| CN | 103440101 A | 12/2013 |

(Continued)

*Primary Examiner* — Edward F Urban
*Assistant Examiner* — Wassim Mahrouka
(74) *Attorney, Agent, or Firm* — Emerson, Thomson & Bennett, LLC; Roger D. Emerson; Warren A. Rosborough

(57) ABSTRACT

A method for smoothing coordinates, a touch chip, and an electronic terminal are provided. The method includes: acquiring touch point coordinates of a current data frame on a touch screen, and touch point coordinates of N consecutive data frames prior to the current data frame, the N is a natural number greater than or equal to 2; performing a Bessel interpolation iteration on the touch point coordinates of N+1 data frames including the current data frame with the touch point coordinates of the N+1 data frames as initial iteration values; and acquiring an iteration result of the Bessel interpolation iteration, and implementing coordinate smoothing according to the iteration result. According to the embodiments of the present disclosure, the cost of smoothing coordinates is lowered, and the effect of smoothing coordinates is improved.

17 Claims, 5 Drawing Sheets

(56) References Cited

U.S. PATENT DOCUMENTS

2018/0338065 A1* 11/2018 Zyskind ................ G06F 3/0442

FOREIGN PATENT DOCUMENTS

| CN | 103500037 A | * | 1/2014 |
| CN | 103500037 A | | 1/2014 |
| CN | 104123027 A | | 10/2014 |
| CN | 105335069 A | | 2/2016 |
| CN | 110349238 A | * | 10/2019 |

* cited by examiner

METHOD FOR SMOOTHING COORDINATES, TOUCH CHIP, AND ELECTRONIC TERMINAL

CROSS-REFERENCE TO RELATED APPLICATION

This application is a continuation of International Application No. PCT/CN2018/083715, filed on Apr. 19, 2018, the application of which is hereby incorporated by reference in its entirety.

TECHNICAL FIELD

Embodiments of the present disclosure relate to the field of touch technologies, and in particular, relate to a method for smoothing coordinates, a touch chip, and an electronic terminal.

BACKGROUND

With developments of the terminal technology, touch screens are being widely applied to various terminal devices. The touch screen detects, by a touch chip, a gesture operation performed and acted thereon. Calculation of touch point coordinates is critical in the detection.

The touch chip calculates the touch point coordinates of a finger (or a passive pen, an active pen) acting on the touch screen substantially by two steps of calculating the coordinates and smoothing the coordinates. In the process of calculating the coordinates, touch point coordinates of a current data frame are calculated according to original data of each node on the touch screen. Due to impacts of ambient noise and system noise, the touch point coordinates of the current data frame may be randomly somewhat deviated from the actual position that is touched by the finger. If the detected coordinates are reported to the system, coordinate jitters and handwriting drifts may be found. Therefore, the coordinates need to be smoothed.

A typical method for smoothing coordinate is: weighted averaging several history data frames. Taking horizontal coordinates, X-coordinates, as examples, an expression for the coordinate smoothing is:

$$X_C = X_0 * K_0 + X_1 * K_1 + X_2 * K_2 + \ldots + X_N * K_N$$

$X_C$ is an X-coordinate of the current data frame upon smoothing, that is, a coordinate that is finally reported to the system; $X_0$ is a detected X-coordinate of the current data frame, $X_1$ is an X-coordinate of a previous data frame of the current data frame, $X_2$ is an X-coordinate of a further previous data frame of the current data frame, . . . , and analogously, $X_N$ is an X-coordinate of an Nth frame prior to the current data frame; $K_0$ is a weighting coefficient of the X-coordinate of the current data frame, $K_1$ is a weighting coefficient of the X-coordinate of the previous data frame of the current data frame, $K_2$ is a weighting coefficient of the X-coordinates of the further previous data frame of the current data frame, . . . , and analogously, $K_N$ is a weighting coefficient of the X-coordinate of the Nth frame prior to the current data frame, and $K_0 + K_1 + K_2 + \ldots + K_N = 1$. With respect to vertical coordinates, the Y-coordinates, the coordinate smoothing thereof is similar to that of the X-coordinates, only by substituting the Y-coordinates for the X-coordinates.

Although this method for smoothing coordinates mitigates the coordinate jitters and handwriting drifts to some extent, the improvements are closely correlated with the plurality of set weighting coefficients. Improper setting of any weighting coefficient may result in degradation of the entire improvement effect. In addition, upon adjustment of a weighting coefficient, all the weighting coefficients need to be readjusted. As such, the entire efficiency is low, the implementation cost of smoothing the coordinates is increased, and the effect of smoothing the coordinates is further affected.

SUMMARY

Embodiments of the present disclosure provides a method for smoothing coordinates, a touch chip, and an electronic terminal, to solve the problem that the conventional method for smoothing coordinates has a high implementation cost and achieves a poor smoothing effect.

According to a first aspect of the embodiments of the present disclosure, a method for smoothing coordinates is provided. The method includes: acquiring touch point coordinates of a current data frame on a touch screen, and touch point coordinates of N consecutive data frames prior to the current data frame, the N being a natural number greater than or equal to 2; performing a Bessel interpolation iteration on the touch point coordinates of N+1 data frames including the current data frame with the touch point coordinates of the N+1 data frames as initial iteration values; and acquiring an iteration result of the Bessel interpolation iteration, and implementing coordinate smoothing according to the iteration result.

According to a second aspect of the embodiments of the present disclosure, a touch chip is further provided. The touch chip includes: an acquiring module, configured to acquire touch point coordinates of a current data frame on a touch screen, and touch point coordinates of N consecutive data frames prior to the current data frame, N being a natural number greater than or equal to 2; an iterating module, configured to perform a Bessel interpolation iteration one the touch point coordinates of N+1 data frames including the current data frame with the touch point coordinates of the N+1 data frames as initial iteration values; and a smoothing module, configured to acquire an iteration result of the Bessel interpolation iteration, and implement coordinate smoothing according to the iteration result.

According to a third aspect of the embodiments of the present disclosure, another touch chip is further provided. The touch chip includes: a processor, a memory, a communication interface, and a communication bus; where the processor, the memory, and the communication interface are in communication with each other via the communication bus; where the memory is configured to store at least one executable instruction, which, when executed by the processor, enables the processor to perform operations corresponding to the method for smoothing coordinates as described in the first aspect.

According to a fourth aspect of the embodiments of the present disclosure, an electronic terminal is further provided. The electronic terminal includes the touch chip as described in the second aspect, or includes the touch chip as described in the third aspect.

In the technical solution for smoothing coordinates according to the embodiments of the present disclosure, during smoothing coordinates on the touch screen, on the basis of touch point coordinates of a current data frame and N history data frames contiguous to the current data frame, new touch point coordinates of the current data frame are finally generated by a Bessel interpolation iteration on the touch point coordinates to implement coordinate smoothing.

In the process of a complete Bessel interpolation iteration, Bessel interpolation coefficients are the same. Compared with the conventional way for smoothing coordinates by weighted averaging, in one aspect, setting of a weighting coefficient is simplified, and the implementation cost of smoothing the coordinates is lowered; in another aspect, by the Bessel interpolation iteration on the touch point coordinates of a plurality of data frames, an iteration result is objective and accurate, coordinate jitters and handwriting drifts are effectively mitigated, and thus the effect of smoothing the coordinates is improved; and in still another aspect, if the effect of smoothing coordinates needs to be adjusted, one Bessel interpolation coefficient only needs to be adjusted, with no need to adjust a plurality of coefficients, such that the speed and efficiency of improving the effect of smoothing coordinates are improved.

BRIEF DESCRIPTION OF THE DRAWINGS

For clearer descriptions of the technical solutions in the embodiments of the present disclosure or in the related art, hereinafter, drawings that are to be referred for description of the embodiments or the related art are briefly described. Apparently, the drawings described hereinafter merely illustrate some embodiments of the present disclosure. Persons of ordinary skill in the art may also derive other drawings based on the drawings described herein without any creative effort.

DETAILED DESCRIPTION

For clearer descriptions and better understanding of the objectives, technical features, and advantages of the present disclosure, the technical solutions according to the embodiments of the present disclosure are further described in detail with reference to the accompany drawings. Apparently, the embodiments described herein are merely some exemplary ones, rather than all the embodiments of the present disclosure. Based on the embodiments of the present disclosure, all other embodiments derived by persons of ordinary skill in the art without any creative efforts shall fall within the protection scope of the embodiments of the present disclosure.

First Embodiment

Figure 1:
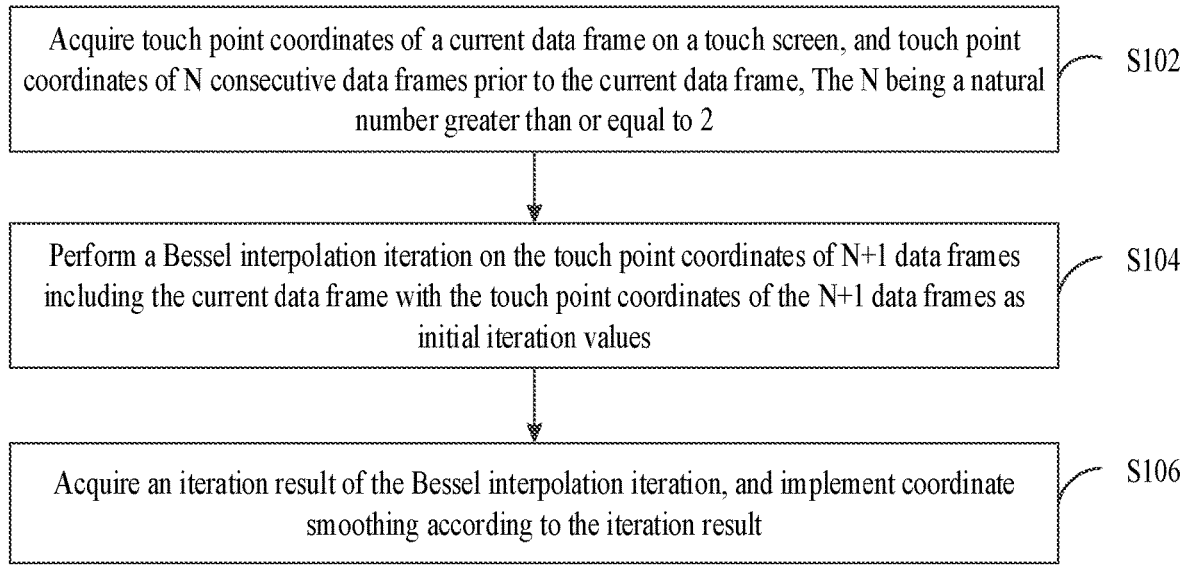
FIG. 1 is a flowchart of steps of a method for smoothing coordinates according to a first embodiment of the present disclosure.

Referring to FIG. 1, a flowchart of steps of a method for smoothing coordinates according to a first embodiment of the present disclosure is illustrated.

The method for smoothing coordinates according to this embodiment includes the following steps:

In step S102, touch point coordinates of a current data frame on a touch screen, and touch point coordinates of N consecutive data frames prior to the current data frame are acquired.

N is a natural number greater than or equal to 2. The current data frame is a data frame detected within a current touch detection cycle.

In the embodiment of the present disclosure, during smoothing coordinates of the current data frame on the touch screen, coordinate data of the N consecutive data frames prior to the current data frame is comprehensively considered, such that objective and accurate reference data is provided for coordinate smoothing of the current data frame. In the embodiment of the present disclosure, for more effectiveness of the reference data, the coordinate data of two consecutive data frames prior to the current data frame is at least considered.

Accordingly, in this step, the touch point coordinates of the N+1 data frames including the current data frame and the N consecutive data frames prior to the current data frame are respectively acquired. Each touch point coordinate includes a horizontal coordinate and a vertical coordinate of the touch point.

In step S104, a Bessel interpolation iteration is performed for the touch point coordinates of N+1 data frames including the current data frame with the touch point coordinates of the N+1 data frames as initial iteration values.

An iteration is a process of repeated feedback, and is a process of repeating a series of operation steps to obtain subsequent outcomes from previous outcomes in a sequence of outcomes. The sequence may approach a desired end outcome or end value. Each repetition of the process is a single iteration, and the outcome of each iteration is then the starting point of the next iteration. A Bessel interpolation refers to constructing a smooth curve by connecting a plurality of points by a Bessel interpolation formula, to finally practice smooth transition between these points. In the embodiment of the present disclosure, the Bessel interpolation and the iteration are combined, a Bessel interpolation result between the touch point coordinates is calculated with the touch point coordinates of the N+1 data frames including the current data frame as the initial iteration values; with respect to the calculated Bessel interpolation result, the above process is repeated to perform a Bessel interpolation calculation between adjacent touch point coordinates in the calculated Bessel interpolation result to acquire a new Bessel interpolation result; and the above process is repeated until a final Bessel interpolation result is obtained.

In an optional embodiment, the Bessel interpolation iteration may be performed for the touch point coordinates of the N+1 data frames in units of two adjacent frames in the N+1 data frames, and a portion between each two points may be smoothed by using the Bessel interpolation formula. Using a case where N is 3 as an example for simple description, assuming that the current data frame is A, a data frame prior to the data frame A is B, a data frame prior to the data frame B is C, and a data frame prior to the data frame C is D, then the Bessel interpolation iteration is performed for touch point coordinates A-CO, B-CO, C-CO, and D-CO corresponding to the four data frames A, B, C, and D. Initially, a first cycle of the Bessel interpolation is performed for the touch point coordinates A-CO, B-CO, C-CO, and D-CO. The Bessel interpolation may be performed for the touch point coordinates A-CO and B-CO to obtain BC1-CO1, then the Bessel interpolation may be performed for the touch point coordinates B-CO and C-CO to obtain BC1-CO2, and finally the Bessel interpolation may be performed for the touch point coordinates C-CO and D-CO to obtain BC1-CO3. It is apparent that by the first cycle of the Bessel interpolation, three Bessel interpolation results are obtained, that is, BC1-CO1, BC1-CO2, and BC1-CO3. Afterwards, a second cycle of the Bessel interpolation is performed for the Bessel interpolation results BC1BC1-CO1, BC1-CO2, and BC1-CO3. The Bessel interpolation is performed for the Bessel interpolation results BC1-CO1 and BC1-CO2 to obtain BC2-CO1, and the Bessel interpolation is performed for the Bessel interpolation results BC1-CO2 and BC1-CO3 to obtain BC2-CO2. Subsequently, a third cycle of the Bessel interpolation is performed for the Bessel interpolation results BC2-CO1 and BC2-CO2, and finally a Bessel interpolation result BC3-CO1 is obtained. Till now, by the third cycle of the Bessel interpolation, only one Bessel interpolation result, BC3BC3-CO1, is obtained, and this Bessel interpolation result is taken as the final Bessel interpolation result. In this way, the Bessel interpolation iteration is completed.

It should be noted that, in practice, the Bessel interpolation is not limited to the interpolation by taking the two adjacent data frame as the units. Instead, a person skilled in the art may perform the Bessel interpolation by taking a plurality of data frames as the units. For example, three data frames or four data frames may be taken as the units as long as the data frames may be uniformly extracted. However, by the Bessel interpolation in units of two adjacent data frames, the effect of smoothing coordinates is better, and the precision is higher.

In step S106, an iteration result of the Bessel interpolation iteration is acquired, and the coordinates are smoothed according to the iteration result.

For example, the iteration result of the Bessel interpolation iteration may be taken as the touch point coordinates of the current data frame to be reported to the system, to smooth the coordinates. That is, the Bessel interpolation iteration result is reported to the system as the smoothed touch point coordinates. However, in practice, a person skilled in the art may also further process the iteration result according to the actual needs, such that the coordinates are smoother or satisfy the actual smoothness requirements.

According to this embodiment, during smoothing coordinates on the touch screen, on the basis of touch point coordinates of a current data frame and N history data frames contiguous to the current data frame, new touch point coordinates of the current data frame are finally generated by a Bessel interpolation iteration on the touch point coordinates, such that the coordinates are smoothed. In the process of a complete Bessel interpolation iteration, Bessel interpolation coefficients are the same. Compared with the conventional way of smoothing coordinates by weighted averaging, in one aspect, setting of a weighting coefficient is simplified, and the implementation cost of smoothing the coordinates is lowered; in another aspect, by the Bessel interpolation iteration on the touch point coordinates of a plurality of data frames, an iteration result is objective and accurate, coordinate jitters and handwriting drifts are effectively mitigated, and thus the effect of smoothing the coordinate is improved; and in still another aspect, if the effect of smoothing coordinates needs to be adjusted, one Bessel interpolation coefficient only needs to be adjusted, with no need to adjust a plurality of coefficients, such that the speed and efficiency of improving the effect of smoothing coordinates are improved.

The method for smoothing coordinates according to this embodiment may be performed by any suitable device or apparatus having data processing capabilities, including, but not limited to, a touch chip and a microcontroller unit (MCU).

Second Embodiment

Figure 2:
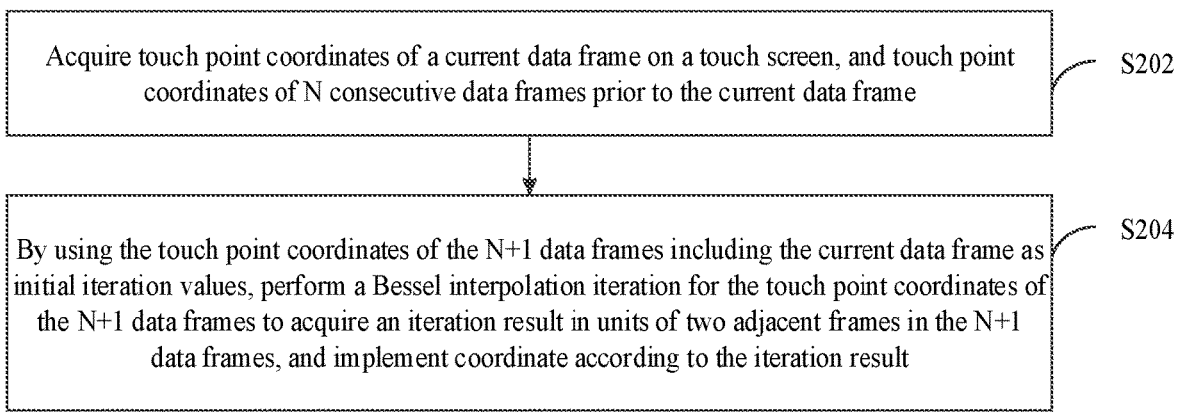
FIG. 2 is a flowchart of steps of a method for smoothing coordinates according to a second embodiment of the present disclosure.

Referring to FIG. 2, a flowchart of steps of a method for smoothing coordinates according to a second embodiment of the present disclosure is illustrated.

The method for smoothing coordinates according to this embodiment includes the following steps:

In step S202, touch point coordinates of a current data frame on a touch screen, and touch point coordinates of N consecutive data frames prior to the current data frame are acquired.

N is a natural number greater than or equal to 2. Optionally, N is a natural number between 5 and 80. Setting the value range of N to be between 5 and 80 not only ensures the effect of smoothing coordinates, but also sufficiently achieves the speed and efficiency of smoothing coordinates. The acquired touch point coordinates of the current data frame, and touch point coordinates of N consecutive data frames prior to the current data frame are both coordinates actually detected.

When a user performs a touch operation on the touch screen, each frame of data operated by the touch operation corresponds to one or a plurality (at least two) of touch point coordinates. If the N consecutive data frames prior to the current data frame includes some data frames not subjected to the touch operation, specific touch point coordinates may be defined for the touch point coordinates of these data frames participating the smoothing but not subjected to the touch operation, to identify these data frames. For example, the touch point coordinates of these data frames may be defined to (0, 0) for the subsequent coordinate smoothing operation.

Accordingly, in this step, the touch point coordinates of the N+1 data frames including the current data frame and the N consecutive data frames prior to the current data frame are respectively acquired, and each frame corresponds to at least one touch point coordinate.

It should be noted that, during the touch operation, if a finger instantaneously leaves from the screen, the coordinates of the current data frame are smoothed according to the history touch point coordinates after the finger leaves from the screen, and data of the history touch point coordinates before the finger leaves from the screen is not involved in smoothing and calculation of the coordinates of the current data frame.

In step S204, by using the touch point coordinates of the N+1 data frames including the current data frame as initial iteration values, a Bessel interpolation iteration is performed for the touch point coordinates of the N+1 data frames to acquire an iteration result in units of two adjacent frames in the N+1 data frames, and the coordinate smoothing is implemented according to the iteration result.

In this embodiment, by taking a case where the Bessel interpolation iteration is performed for the touch point coordinates of the N+1 data frames in units of two adjacent data frames in the N+1 data frames, the technical solution of smoothing coordinates according to the embodiment of the present disclosure is described. However, a person skilled in the art should note that for details of a Bessel interpolation iteration in units of data frames in another number, the corresponding operations for smoothing coordinates may be practiced with reference to the principles of the Bessel interpolation and the technical solution according to this embodiment.

In an initial iteration, the Bessel interpolation iteration may be performed in sequence for the touch point coordinates corresponding to the N+1 data frames according to a time sequence of the N+1 data frames (for example, if the current data frame is A, a data frame B is a previous data frame of the data frame A, that is, the data frame B is prior to the data frame A in terms of time; if coordinates A1 are touch point coordinates in the data frame A, coordinates B1 are touch point coordinates in the data frame B, and if the Bessel interpolation is performed between the touch point coordinates of two adjacent data frames, the Bessel interpolation is performed for the coordinates A1 and the coordinates B1); a plurality of touch point coordinates having a first time series relationship that are generated by the Bessel interpolation are acquired according to the Bessel interpolation result; the Bessel interpolation iteration is performed for the plurality of generated touch point coordinates until an iteration termination condition is satisfied.

The time sequence represents a sequence formed by arranging the values having the same statistical index in a chronological order of the values. In the embodiments of the present disclosure, the time series of the data frames includes a plurality of data frames in the chronological order. Similarly, the time series relationship refers to a relationship of the time series. In the embodiments of the present disclosure, the touch point coordinates having the time series relationship are a plurality of touch point coordinates having the chronological order.

The iteration termination condition may be set by a person skilled in the art according to the actual needs. For example, the iteration termination condition may be set to a suitable iteration count or iteration result. In the embodiments of the present disclosure, the iteration termination condition is set as follows: the number of iteration results of various touch point coordinates in an iteration cycle is 1, such that setting and practice of the iteration termination condition are simple, and the implementation cost is low. On the basis of the setting that N is greater than or equal to 2 in the embodiments of the present disclosure, a final iteration result may be obtained at least by two cycles of Bessel interpolation iterations. Therefore, after a plurality of Bessel interpolation results are acquired by performing the Bessel interpolation for the initial touch point coordinates, the Bessel interpolation iteration still needs to be performed for the interpolation results.

In an optional embodiment, the process of continuing the Bessel interpolation iteration on the plurality of generated touch point coordinates until the iteration termination condition is satisfied includes: with respect to each of the touch point coordinates of the current data frame, performing the Bessel interpolation for the touch point coordinates in sequence according to the first time series relationship between the corresponding plurality of touch point coordinates; acquiring, according to the first time series relationship and the Bessel interpolation result, at least one touch point coordinate having a second time series relationship that is generated by the Bessel interpolation; determining whether a number of touch point coordinates having the second time series relationship is 1; when the number is 1, terminating the Bessel interpolation iteration; and when the number is not 1, updating a plurality of prior touch point coordinates corresponding to current touch point coordinates with the touch point coordinates having the second time series relationship, updating the first time series relationship with the second time series relationship, and returning to continue the step of performing the Bessel interpolation for the touch point coordinates in sequence according to the first time series relationship between the corresponding plurality of touch point coordinates.

Generally, the touch operation may involve a plurality of data frames. Each frame corresponds to at least one touch point that is touched (for example, a capacitor node), and thus has the corresponding touch point coordinates. In this case, each touch point coordinates needs to smoothed. In a case where the touch operation generates a track, correspondingly, each touch point in the current data frame may correspond to a series of touch points forming tracks in a plurality of data frames prior to the current data frame. In this case, the coordinates of each touch point in the current data frame need to be smoothed according to the touch point coordinates of the touch points corresponding to each touch point in the current data frame. For example, if the current data frame corresponds to three touch points A, B, and C, a previous data frame of the current data frame includes three touch points A1, B1, and C1 corresponding to the touch points A, B, and C, and a still previous data frame of the previous data frame includes three touch points A2, B2, and C2 corresponding to the touch points A1, B1, and C1, then the coordinates of the touch point A need to be smoothed according to the coordinates of the touch points A, A1, and A2, the coordinates of the touch point B need to be smoothed according to the coordinates of the touch points B, B1, and B2, and the coordinates of the touch point C need to be smoothed according to the coordinates of the touch points C, C1, and C2.

For ease of description, taking a case where one data frame only includes one touch point as an example, a plurality of touch point coordinates in the initial Bessel interpolation iteration are the N+1 touch point coordinates corresponding to the N+1 data frames, and the initial time series relationship is the same as the time series of the N+1 data frame. By a Bessel interpolation for the N+1 touch point coordinates corresponding to the N+1 data frames, N Bessel interpolation results are acquired; by a Bessel interpolation for the N Bessel interpolation results, N−1 Bessel interpolation results are acquired; by a Bessel interpolation for the N−1 Bessel interpolation results, N−2 Bessel interpolation results are acquired; . . . and analogously, finally, only one Bessel interpolation result is acquired. When a data frame corresponds to a plurality of touch points (when a touch area between a touch object and the touch screen is relatively large), with respect to each touch point, the Bessel interpolation iteration is performed with reference to the above fashion.

The time series relationship of the Bessel interpolation results generated each time is correlated with the time series of the Bessel interpolation results generated in a previous cycle of the Bessel interpolation. Still taking the case where one data frame only includes one touch point as an example, in the initial iteration, the initial time series relationship of the N+1 touch point coordinates is the same as the time series of the N+1 data frames. As described above, if the current data frame is A, a data frame prior to the data frame A is B, a data frame prior to the data frame B is C, and a data frame prior to the data frame C is D, then the time series relationship of the touch point coordinates A-CO, B-CO, C-CO, and D-CO corresponding to the four data frames A, B, C, and D is A-CO→B-CO→C-CO→D-CO. During the Bessel interpolation between each two touch point coordinates, according to the time series relationship, the Bessel interpolation may be first performed for A-CO and B-CO, then performed for B-CO and C-CO, and finally performed for C-CO and D-CO. The interpolation results are ranked according to the time series relationship of the previous touch point coordinates, and thus a new positional relationship is formed, that is, the first time series relationship. In this embodiment, the first time series relationship of the interpolation results in this cycle of the Bessel interpolation iteration is: a Bessel interpolation result (marked as BC1-CO1) of A-CO and B-CO→ a Bessel interpolation result (marked as BC1-CO2) of B-CO and C-CO→ a Bessel interpolation result (marked as BC1-CO3) of C-CO and D-CO.

Upon completion of one cycle of the Bessel interpolation, whether to terminate or continue the Bessel interpolation iteration may be determined according to the number of interpolation results. If the final Bessel interpolation result fails to be acquired, that is, the number of Bessel interpolation results is not 1, the Bessel interpolation iteration needs to be continued; and if the number of Bessel interpolation results is 1, the final result is acquired, and in this case, the Bessel interpolation iteration may be terminated.

As described in the above, the acquired Bessel interpolation results include BC1-CO1, BC1-CO2, and BC1-CO3. Therefore, a next cycle of the Bessel interpolation needs to be continued. During this cycle of the Bessel interpolation, taking BC1-CO1, BC1-CO2 and BC1-CO3 as a plurality of touch point coordinates for interpolation, and taking the time series relationships BC1-CO1→BC1-CO2→BC1-CO3 as the first time series relationship, the Bessel interpolation is performed for each two touch point coordinates of BC1-CO1, BC1-CO2 and BC1-CO3 to acquire a Bessel interpolation result (marked as BC2-CO1) of BC1-CO1 and BC1-CO2, and a Bessel interpolation result (marked as BC2-CO2) of BC1-CO2 and BC1-CO3. BC2-CO1 and BC2-CO2 are ranked according to the time series relationship in the previous cycle, to form the second time series relationship in this cycle, that is, BC2-CO1→BC2-CO2. Upon completion of this cycle of the Bessel interpolation, the number of generated Bessel interpolation results is still not 1, and in this case, a third cycle of the Bessel interpolation needs to be continued for BC2-CO1 and BC2-CO2.

In the third cycle of the Bessel interpolation, BC2-CO1 and BC2-CO2 CO2 are a plurality of new touch point coordinates for interpolation, and the Bessel interpolation is performed by using BC2-CO1→BC2-CO2 as a new first time series relationship. In this cycle, after the Bessel interpolation is performed for BC2-CO1 and BC2-CO2, a Bessel interpolation result (marked as BC3-CO1) is acquired. Upon completion of this cycle of the Bessel interpolation, only one Bessel interpolation result is finally generated. In this case, the Bessel interpolation iteration may be terminated, and the coordinates may be smoothed according to the final iteration result.

It should be noted that the above examples are all described by taking a case where the current data frame is used as a starting data frame, and from the current data frame to the $(N+1)^{th}$ data frame, the Bessel interpolation is performed for the touch coordinates of each two data frames as an example. However, practice of these examples is not limited to this case. In practice, the Bessel interpolation may be performed for the adjacent touch point coordinates in any suitable sequence according to the actual needs, and a sequence of the interpolation results may be determined according to the time series of the previous touch point coordinates. For example, the Bessel interpolation may be first performed for D-CO and C-CO, then performed for C-CO and B-CO, and finally performed for B-CO and A-CO.

Depending on the interpolation fashion and interpolation formula, the generated Bessel interpolation result may be a linear Bessel curve, a quadric Bessel curve, a cubic Bessel curve or other forms. For simplifying coordinate smoothing and improving the speed and efficiency of coordinate smoothing, in the embodiment of the present disclosure, the employed Bessel interpolation is the Bessel linear interpolation (linear Bessel curve). A person skilled in the art should acknowledge that the other Bessel interpolations may also be applicable to the technical solutions of smoothing coordinates according to the embodiments of the present disclosure.

In addition, during the Bessel interpolation for the touch point coordinates, the Bessel interpolation may be performed on a horizontal coordinate and a vertical coordinate of a touch point respectively. That is, the Bessel interpolation for the touch point coordinates of the N+1 data frames may be performed by: performing a Bessel interpolation iteration for a horizontal coordinate on horizontal coordinates of the touch point coordinates of the N+1 data frames and a Bessel interpolation iteration for a vertical coordinate on vertical coordinates of the touch point coordinates of the N+1 data frames respectively, to simplify the calculation and improve the speed of the Bessel interpolation.

By the above process, preliminary coordinate smoothing may be practiced when the user performs a touch operation on the touch screen. However, for a better coordinate smoothing effect, while smoothing the touch tracks (that is, reducing coordinate drifts), the follow features of the coordinates may also be improved, such that coordinate smoothing and following are both achieved. Therefore, the specific process of acquiring the iteration result and implementing coordinate smoothing according to the iteration result may include the following optional sub-step S2042 to sub-step S2048.

In sub-step S2042, the iteration result of the Bessel interpolation iteration is acquired, and whether a difference between the iteration result and the touch point coordinates of the current data frame is greater than a first predetermined threshold is determined. when the difference is greater than the first predetermined threshold, sub-step S2044 is performed; and otherwise, sub-step S2046 is performed.

The first predetermined threshold may be appropriately defined by a person skilled in the art according to the actual needs, which is not limited in the embodiment of the present disclosure. Optionally, the first predetermined threshold may be 3 mm.

The difference between the iteration result and the touch point coordinates of the current data frame may also be defined by a person skilled in the art to any suitable form, for example, a distance or a standard difference.

By the difference between the iteration result and the touch point coordinates of the current data frame, a distance between the touch point coordinates calculated by the Bessel interpolation and the real coordinates may be determined. This distance may represent a lag of coordinate following. By defining the first predetermined threshold, this lag may be effectively controlled.

In sub-step S2044, when the difference between the iteration result and the touch point coordinates of the current data frame is greater than the first predetermined threshold, a Bessel interpolation coefficient is decreased, and the Bessel interpolation iteration is performed again for the touch point coordinates of the N+1 data frames by using the decreased Bessel interpolation coefficient, until the difference between the iteration result and the touch point coordinates of the current data frame is less than the first predetermined threshold or satisfies a down-shift termination condition of the Bessel interpolation coefficient. Then, sub-step S2048 is performed.

By studies on smoothing the coordinates by the Bessel interpolation, it is found that the greater the Bessel interpolation coefficient, the smoother the output coordinates, but the greater the lag of the coordinates whereas the less the Bessel interpolation coefficient, the more the output coordinate drifts, but the better the coordinate following. Accordingly, by adjustment of the Bessel interpolation coefficients, balance may be achieved between the coordinate smoothing and the coordinate following.

When the difference between the iteration result and the touch point coordinates of the current data frame is greater than the first predetermined threshold, the coordinate lag is caused, and the follow feature is poor. In this case, the follow feature of the coordinates may be improved by decreasing the Bessel interpolation coefficient. In this way, the coordinate follow feature is improved while the coordinate smoothing is ensured. In this embodiment, after the Bessel interpolation coefficient is decreased, the Bessel interpolation iteration may be performed again for the touch point coordinates of the N+1 data frames by using the decreased Bessel interpolation coefficient (for example, substituting the decreased Bessel interpolation coefficient for the original Bessel interpolation coefficient, and returning to step S204 to perform the Bessel interpolation iteration again), until the difference between the iteration result and the touch point coordinates of the current data frame is less than the first predetermined threshold predetermined threshold or satisfies a down-shift termination condition of the Bessel interpolation coefficient.

The down-shift termination condition of the Bessel interpolation coefficient may include: a decrease of the Bessel interpolation coefficient reaching a predetermined decrease upper limit, or the Bessel interpolation coefficient reaching a predetermined lower limit. The decrease upper limit or the lower limit may be defined by a person skilled in the art according to the actual needs. For example, the decrease upper limit may be defined to 2*(1/N), and the lower limit may be defined to 0, which are not limited in the embodiment of the present disclosure.

In sub-step S2046, when the difference is not greater than the first predetermined threshold, the Bessel interpolation coefficient is increased, and the Bessel interpolation iteration is performed again for the touch point coordinates of the N+1 data frames by using the increased Bessel interpolation coefficient, until the difference between the iteration result and the touch point coordinates of the current data frame is greater than a second predetermined threshold predetermined threshold or satisfies an up-shift termination condition of the Bessel interpolation coefficient. Then, sub-step S2048 is performed.

The second predetermined threshold may be appropriately defined by a person skilled in the art according to the actual needs, which is not limited in the embodiment of the present disclosure. Optionally, the second predetermined threshold may be 2 mm. By the first predetermined threshold and the second predetermined threshold, an acceptable coordinate follow speed range is defined. On the basis of this range, coordinate smoothness may be further adjusted.

If the difference between the iteration result and the touch point coordinates of the current data frame is not greater than the first predetermined threshold, it indicates that the coordinate follow feature may be in an acceptable range, but the smoothness may be poor. In this case, the smoothness may be improved by increasing the Bessel interpolation coefficient. In this embodiment, after the Bessel interpolation coefficient is increased, the Bessel interpolation iteration may be performed again for the touch point coordinates of the N+1 data frames by using the increased Bessel interpolation coefficient (for example, substituting the increased Bessel interpolation coefficient for the original Bessel interpolation coefficient, and returning to step S204 to perform the Bessel interpolation iteration again), until the difference between the iteration result and the touch point coordinates of the current data frame is greater than a second predetermined threshold predetermined threshold or satisfies an up-shift termination condition of the Bessel interpolation coefficient.

The up-shift termination condition of the Bessel interpolation coefficient may include: an increase of the Bessel interpolation coefficient reaching a predetermined increase upper limit, or the Bessel interpolation coefficient reaching a predetermined upper limit. The increase upper limit or the upper limit may be defined by a person skilled in the art according to the actual needs. For example, the increase upper limit may be defined to 1/N, and the upper limit may be defined to ½, which are not limited in the embodiment of the present disclosure.

In sub-step S2048, a final iteration result of the Bessel interpolation iteration upon adjustment of the Bessel interpolation coefficient is acquired, and the coordinate smoothing is implemented according to the final iteration result.

This process includes: updating the touch point coordinates of the current data frame with the final iteration result of the Bessel interpolation iteration to smooth the coordinates.

If sub-step S2042 to sub-step S2048 are not performed, in this step, the iteration result of the Bessel interpolation iteration in step S204 may be used, that is, the iteration result obtained before adjustment of the Bessel interpolation coefficient. If sub-step S2042 to sub-step S2048 are performed, in this step, the acquired iteration result of the Bessel interpolation iteration is the final iteration result of the Bessel interpolation iteration upon adjustment of the Bessel interpolation coefficient.

According to this embodiment, during smoothing coordinates on the touch screen, on the basis of touch point coordinates of a current data frame and N history data frames contiguous to the current data frame, new touch point coordinates of the current data frame are finally generated by a Bessel interpolation iteration on the touch point coordinates, such that the coordinates are smoothed. In the process of a complete Bessel interpolation iteration, Bessel interpolation coefficients are the same. Compared with the conventional way of smoothing coordinates by weighted averaging, in one aspect, setting of a weighting coefficient is simplified, and the implementation cost of smoothing the coordinates is lowered; in another aspect, by the Bessel interpolation iteration on the touch point coordinates of a plurality of data frames, an iteration result is objective and accurate, coordinate jitters and handwriting drifts are effectively mitigated, and thus the effect of smoothing the coordinate is improved; and in still another aspect, if the effect of smoothing coordinates needs to be adjusted, one Bessel interpolation coefficient only needs to be adjusted, with no need to adjust a plurality of coefficients, such that the speed and efficiency of improving the effect of smoothing coordinates are improved.

In addition, by adjustment of the Bessel interpolation coefficients, balance is achieved between the coordinate smoothing and the coordinate following.

The method for smoothing coordinates according to this embodiment may be performed by any suitable device or apparatus having data processing capabilities, including, but not limited to, a touch chip and an MCU.

Third Embodiment

Figure 3:
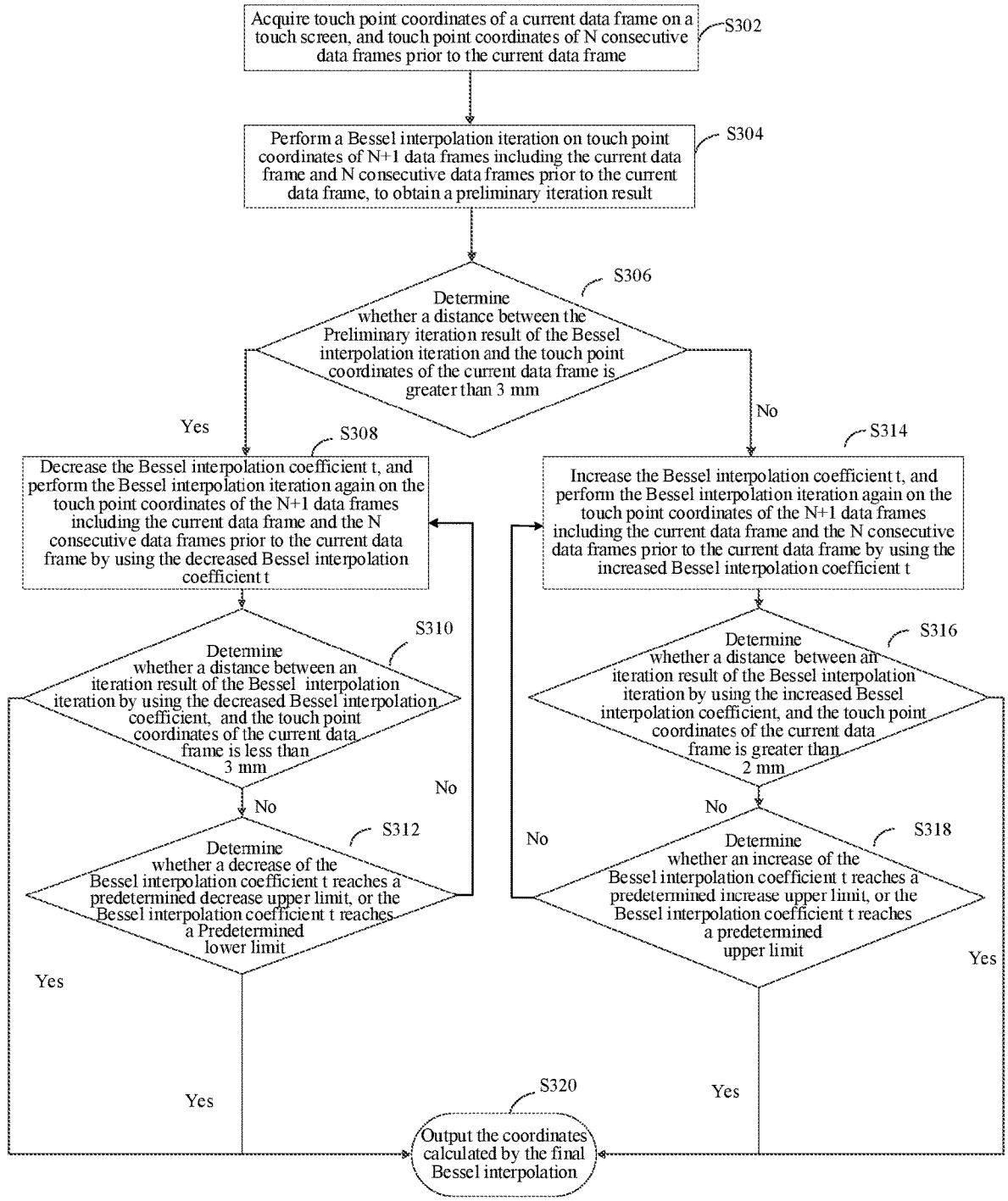
FIG. 3 is a flowchart of steps of a method for smoothing coordinates according to a third embodiment of the present disclosure.

Referring to FIG. 3, a flowchart of steps of a method for smoothing coordinates according to a third embodiment of the present disclosure is illustrated.

In this embodiment, the technical solution of smoothing coordinates according to the present disclosure is described by a specific example. The method for smoothing coordinates according to this embodiment includes the following steps:

In step S302, touch point coordinates of a current data frame on a touch screen, and touch point coordinates of N consecutive data frames prior to the current data frame are acquired.

In this embodiment, for ease of description, N is 4. That is, the technical solution for smoothing coordinates according to this embodiment is described by taking five data frames as an example. During the processing, the Bessel interpolation iteration is performed on the horizontal coordinates and the vertical coordinates of the touch points respectively. The acquired touch point coordinates of the current data frame, and touch point coordinates of N consecutive data frames prior to the current data frame are both coordinates actually detected.

For example, $X_{10}$ is the X-coordinate (that is, the horizontal coordinate) of the current data frame, $X_{11}$ is the X-coordinate of the previous data frame of the current data frame, $X_{12}$ is the X-coordinate of the further previous data frame of the current data frame, . . . , and analogously, $X_{14}$ is the X-coordinate of the fourth frame prior to the current data frame. Representation and processing of the Y-coordinates (that is, the vertical coordinates) of the touch points are similar to those of the X-coordinates. In this embodiment, description is given by taking the X-coordinates as examples. A person skilled in the art may substitute the Y-coordinates for the X-coordinates to process the Y-coordinates with reference to the processing of the X-coordinates, which is not described herein any further.

In step S304, a Bessel interpolation iteration is performed for touch point coordinates of N+1 data frames including the current data frame and N consecutive data frames prior to the current data frame, to obtain a preliminary iteration result.

For the practice of the Bessel interpolation iteration, reference may be made to the related description in the first embodiment or the second embodiment. In this embodiment, when a touch operation is initially performed, an initial Bessel interpolation coefficient is t=t0, where t0 may be appropriately defined by a person skilled in the art according to the actual needs. In an optional embodiment, t0 may be defined to 0.5. It should be noted that, the Bessel interpolation coefficient t only needs to be initialized once each time the device is powered on and the touch operation is initially performed, and there is no need to initialize the coefficient each time the touch operation is performed. During the period between this power-on and a next power-on, the Bessel interpolation coefficient needs to be initialized in the initialization stage, and subsequently, when coordinates of a data frame on the touch screen need to be smoothed, the Bessel interpolation coefficient of a previous data frame of this data frame may be still used.

Figure 4:
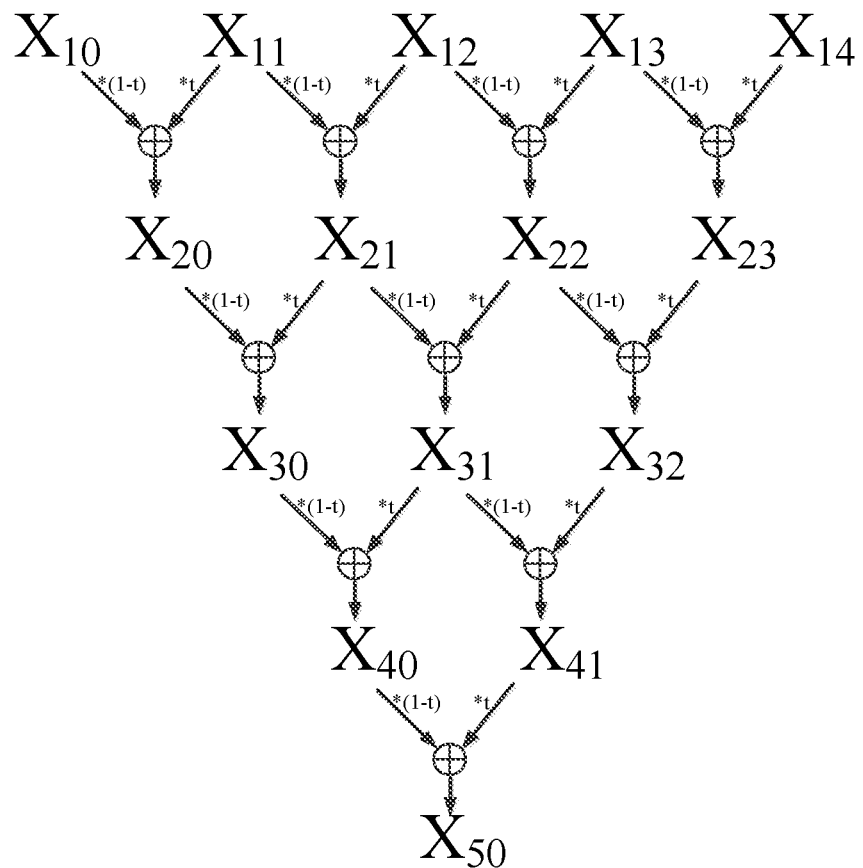
FIG. 4 is a schematic diagram of smoothing of an X-coordinate according to the embodiment as illustrated in FIG. 3.

Hereinafter, this step is illustratively described by taking the process of smoothing the X-coordinate of a touch point in the current data frame in FIG. 4 as an example. As illustrated in FIG. 4, after a plurality horizontal coordinates $X_{10}$, $X_{11}$, $X_{12}$, $X_{13}$, and $X_{14}$ corresponding to a touch point in a plurality of data frames by step S302, these horizontal coordinates of the touch point are interpolated by using the Bessel linear interpolation formula. Specifically, $X_{20}=X_{10}*(1-t)+X_{11}*t$, $X_{21}=X_{11}*(1-t)+X_{12}*t$, $X_{22}=X_{12}*(1-X_{13}t$, $X_{23}=X_{13}*(1-X_{14}*t$. Afterwards, the Bessel linear interpolation is performed for $X_{20}$, $X_{21}$, $X_{22}$, and $X_{23}$, including $X_{30}=X_{20}*(1-t)+X_{21}*t$, $X_{31}=X_{21}*(1-t)+X_{22}*t$, $X_{32}=X_{22}*(1-t)+X_{23}*t$. Subsequently, the Bessel linear interpolation is performed for $X_{30}$, $X_{31}$, and $X_{32}$, including $X_{40}=X_{30}*(1-t)+X_{31}*t$, $X_{41}=X_{31}*(1-t)+X_{32}*t$. Then, the Bessel linear interpolation is performed for $X_{40}$ and $X_{41}$, including $X_{50}=X_{40}*(1-t)+X_{41}*t$. A finally output coordinate is $X_{50}$. Likewise, the X-coordinates of the other touch points and the Y-coordinates of all the touch points may be calculated in the same way, and respective finally output coordinates may be acquired.

In step S306, whether a distance between the preliminary iteration result of the Bessel interpolation iteration and the touch point coordinates of the current data frame is greater than 3 mm is determined. If the distance is greater than 3 mm, step S308 is performed; and otherwise, step S314 is performed.

A lag distance, that is, the follow feature, of the coordinates may be determined according to the distance between the preliminary iteration result of the Bessel interpolation iteration and the touch point coordinates (the actually detected coordinates) of the current data frame, such that the corresponding adjustment may be made to achieve both the smoothing and the follow feature of the coordinates. Since the same Bessel interpolation is employed for all the touch point coordinates, during the specific determination, one or some touch point coordinates may be determined, or all the touch point coordinates may be determined respectively. When a plurality of touch point coordinates are involved, whether the final distance is greater than 3 mm may be determined by averaging the distances.

In step S308, the Bessel interpolation coefficient t is decreased, and the Bessel interpolation iteration is performed again for the touch point coordinates of the N+1 data frames including the current data frame and the N consecutive data frames prior to the current data frame by using the decreased Bessel interpolation coefficient t.

In the coordinate smoothing by the Bessel interpolation iteration, the finally output smoothness of the coordinates may be controlled by adjusting the Bessel interpolation coefficient. The greater the t, the smoother the output coordinates, but the greater the coordinate lag; whereas the less the t, the more the output coordinate drifts, but the better the follow feature of the coordinates.

In step S310, whether a distance between an iteration result of the Bessel interpolation iteration by using the decreased Bessel interpolation coefficient, and the touch point coordinates of the current data frame is less than 3 mm is determined. If the distance is less than 3 mm, step S320 is performed; and otherwise, step S312 is performed.

In step S312, whether a decrease of the Bessel interpolation coefficient t reaches a predetermined decrease upper limit, or the Bessel interpolation coefficient t reaches a predetermined lower limit is determined. If the decrease reaches predetermined decrease upper limit or reaches the predetermined lower limit, step S320 is performed; and otherwise, the process returns to step S308.

The decrease upper limit and the lower limit may be both appropriately defined by a person skilled in the art according to the actual needs. For example, the decrease upper limit is defined to 2*(1/N), and the lower limit is defined to 0.

In step S314, the Bessel interpolation coefficient t is increased, and the Bessel interpolation iteration is performed again for the touch point coordinates of the N+1 data frames including the current data frame and the N consecutive data frames prior to the current data frame by using the increased Bessel interpolation coefficient t.

In step S316, whether a distance between an iteration result of the Bessel interpolation iteration by using the increased Bessel interpolation coefficient, and the touch point coordinates of the current data frame is greater than 2 mm is determined. If the distance is greater than 2 mm, step S320 is performed; and otherwise, step S318 is performed.

In step S318, whether an increase of the Bessel interpolation coefficient t reaches a predetermined increase upper limit, or the Bessel interpolation coefficient t reaches a predetermined upper limit is determined. If the decrease reaches predetermined increase upper limit or reaches the predetermined upper limit, step S320 is performed; and otherwise, the process returns to step S314.

The increase upper limit and the upper limit may be both appropriately defined by a person skilled in the art according to the actual needs. For example, the increase upper limit is defined to 1/N, and the upper limit is defined to ½.

In step S320, the coordinates calculated by the final Bessel interpolation are output.

According to this embodiment, the coordinates are smoothed by using the Bessel interpolation, the coordinate lag may be overcome while the coordinates are smoothed, and the coordinates may be timely corrected by adjusting the Bessel interpolation coefficient. Accordingly, coordinate jitters and handwriting drifts are overcome, while the lag distance (the distance of the calculated coordinates and the actual coordinates) is ensured to be in a controllable and acceptable range.

During the conventional coordinate smoothing by weighting, the coordinates may be smoothed and adjusted after all the weighting parameters are adjusted. As a result, a lag of the coordinates relative to the actual position may be caused; and in addition, a higher handwriting speed results in a severer lag, and a poor user experience. However, by the Bessel interpolation iteration, the coordinates may be smoothed and the lag is overcome by adjusting only one Bessel interpolation coefficient. This greatly improves the speed and efficiency of the adjustment.

Fourth Embodiment

Figure 5:
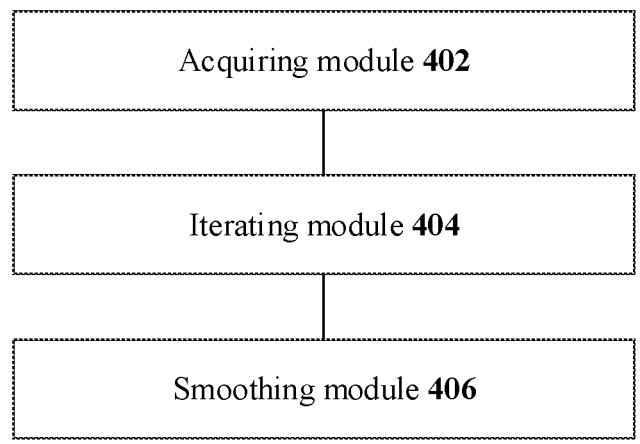
FIG. 5 is a structural block diagram of a touch chip according to a fourth embodiment of the present disclosure.

Referring to FIG. 5, a structural block diagram of a touch chip according to a fourth embodiment of the present disclosure is illustrated.

The touch chip includes: an acquiring module 402, configured to acquire touch point coordinates of a current data frame on a touch screen, and touch point coordinates of N consecutive data frames prior to the current data frame, the N is a natural number greater than or equal to 2; an iterating module 404, configured to perform a Bessel interpolation iteration on the touch point coordinates of N+1 data frames including the current data frame with the touch point coordinates of the N+1 data frames as initial iteration values; and a smoothing module 406, configured to acquire an iteration result of the Bessel interpolation iteration, and implement coordinate smoothing according to the iteration result.

By the touch chip according to the embodiment of the present disclosure, during smoothing coordinates on the touch screen, on the basis of touch point coordinates of a current data frame and N history data frames contiguous to the current data frame, new touch point coordinates of the current data frame are finally generated by a Bessel interpolation iteration on the touch point coordinates, such that the coordinates are smoothed. In the process of a complete Bessel interpolation iteration, Bessel interpolation coefficients are the same. Compared with the conventional way of smoothing coordinates by weighted averaging, in one aspect, setting of a weighting coefficient is simplified, and the implementation cost of smoothing the coordinates is lowered; in another aspect, by the Bessel interpolation iteration on the touch point coordinates of a plurality of data frames, an iteration result is objective and accurate, coordinate jitters and handwriting drifts are effectively mitigated, and thus the effect of smoothing the coordinate is improved; and in still another aspect, if the effect of smoothing coordinates needs to be adjusted, one Bessel interpolation coefficient only needs to be adjusted, with no need to adjust a plurality of coefficients, such that the speed and efficiency of improving the effect of smoothing coordinates are improved.

Fifth Embodiment

Figure 6:
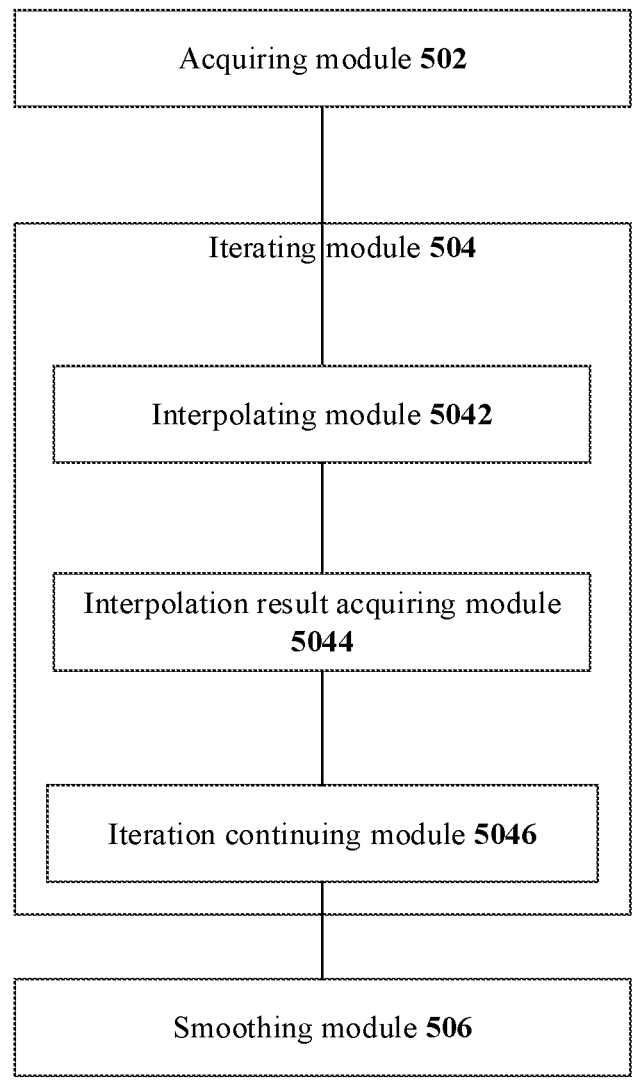
FIG. 6 is a structural block diagram of a touch chip according to a fifth embodiment of the present disclosure.

Referring to FIG. 6, a structural block diagram of a touch chip according to a fifth embodiment of the present disclosure is illustrated.

The touch chip includes: an acquiring module 502, configured to acquire touch point coordinates of a current data frame on a touch screen, and touch point coordinates of N consecutive data frames prior to the current data frame, the N is a natural number greater than or equal to 2; an iterating module 504, configured to perform a Bessel interpolation iteration on the touch point coordinates of N+1 data frames including the current data frame with the touch point coordinates of the N+1 data frames as initial iteration values; and a smoothing module 506, configured to acquire an iteration result of the Bessel interpolation iteration, and implement coordinate smoothing according to the iteration result.

Optionally, the iterating module 504 includes: an interpolating module 5042, configured to perform the Bessel interpolation iteration in sequence for the touch point coordinates corresponding to the N+1 data frames according to a time sequence of the N+1 data frames; an interpolation result acquiring module 5044, configured to acquire, according to the Bessel interpolation result, a plurality (at least two) of touch point coordinates having a first time series relationship that are generated by the Bessel interpolation; and an iteration continuing module 5046, configured to perform the Bessel interpolation iteration on the plurality of generated touch point coordinates until an iteration termination condition is satisfied.

Optionally, the iteration continuing module 5046 is configured to: with respect to each of the touch point coordinates of the current data frame, perform the Bessel interpolation for the touch point coordinates in sequence according to the first time series relationship between the corresponding plurality of touch point coordinates; acquire, according to the first time series relationship and the Bessel interpolation result, at least one touch point coordinate having a second time series relationship that is generated by the Bessel interpolation; determine whether a number of touch point coordinates having the second time series relationship is 1; when the number is 1, terminate the Bessel interpolation iteration; and when the number is not 1, update a plurality of touch point coordinates corresponding to current touch point coordinates with the touch point coordinates having the second time series relationship, update the first time series relationship with the second time series relationship, and return to continue the step of performing the Bessel interpolation for the touch point coordinates in sequence according to the first time series relationship between the corresponding plurality of touch point coordinates.

Optionally, the Bessel interpolation iteration includes a Bessel linear interpolation iteration.

Optionally, the iterating module 504 is configured to: by using the touch point coordinates of the N+1 data frames including the current data frame as the initial iteration values, perform a Bessel interpolation iteration for a horizontal coordinate on horizontal coordinates of the touch point coordinates of the N+1 data frames and a Bessel interpolation iteration for a vertical coordinate on vertical coordinates of the touch point coordinates of the N+1 data frames respectively in units of two adjacent frames in the N+1 data frames.

Optionally, the smoothing module 506 is configured to: acquire the iteration result of the Bessel interpolation iteration, and determine whether a difference between the iteration result and the touch point coordinates of the current data frame is greater than a first predetermined threshold; and when the difference is greater than the first predetermined threshold, decrease a Bessel interpolation coefficient, and perform the Bessel interpolation iteration again for the touch point coordinates of the N+1 data frames by using the decreased Bessel interpolation coefficient, until the difference between the iteration result and the touch point coordinates of the current data frame is less than the first predetermined threshold or satisfies a down-shift termination condition of the Bessel interpolation coefficient; or when the difference is not greater than the first predetermined threshold, increase the Bessel interpolation coefficient, and perform the Bessel interpolation iteration again for the touch point coordinates of the N+1 data frames by using the increased Bessel interpolation coefficient, until the difference between the iteration result and the touch point coordinates of the current data frame is greater than a second predetermined threshold predetermined threshold or satisfies an up-shift termination condition of the Bessel interpolation coefficient.

Optionally, the down-shift termination condition of the Bessel interpolation coefficient includes: a decrease of the Bessel interpolation coefficient reaching a predetermined decrease upper limit, or the Bessel interpolation coefficient reaching a predetermined lower limit; and/or the up-shift termination condition of the Bessel interpolation coefficient includes: an increase of the Bessel interpolation coefficient reaching a predetermined increase upper limit, or the Bessel interpolation coefficient reaching a predetermined upper limit.

Optionally, the first predetermined threshold is 3 mm, and the second predetermined threshold is 2 mm.

Optionally, the smoothing module 506 is configured to update the touch point coordinates of the current data frame with the iteration result of the Bessel interpolation iteration to implement coordinate smoothing.

Optionally, N is a natural number between 5 and 80.

The touch chip according to this embodiment is configured to perform the corresponding methods for smoothing coordinates according to the above method embodiments, and thus achieves the corresponding technical effects as disclosed in the method embodiments, which are not described herein any further.

Sixth Embodiment

Figure 7:
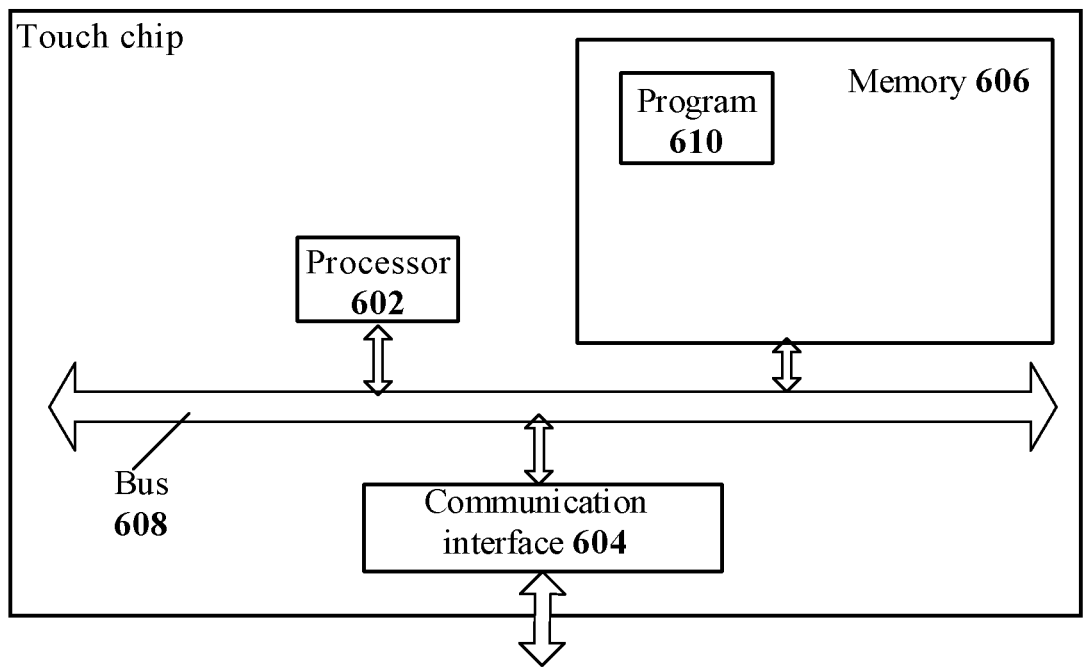
FIG. 7 is a schematic structural diagram of a touch chip according to a sixth embodiment of the present disclosure.

Referring to FIG. 7, a schematic structural diagram of a touch chip according to a sixth embodiment of the present disclosure is illustrated. The embodiments of the present disclosure set no limitation to the practice of the touch chip.

As illustrated in FIG. 7, the touch chip may include: a processor 602, a communication interface 604, a memory 606, and a communication bus 608.

The processor 602, the communication interface 604, and the memory 606 communicate with each other via the communication bus 608.

The communication interface 604 is configured to communicate with other elements in a device where the touch chip is deployed.

The processor 602 is configured to execute a program 610, and may specifically perform the steps in the embodiments of the method for smoothing coordinates.

Specifically, the program 610 may include a program code, where the program code includes a computer-executable instruction.

The processor 602 may be a micro-processing unit (MPU) or an application specific integrated circuit (ASIC), or configured as one or more integrated circuits for implementing the embodiments of the present disclosure.

The memory 606 is configured to store the program 610. The memory 606 may include a high-speed RAM memory, or may also include a non-volatile memory.

The program 610 may be specifically configured to enable the processor 602 to: acquire touch point coordinates of a current data frame on a touch screen, and touch point coordinates of N consecutive data frames prior to the current data frame, the N is a natural number greater than or equal to 2; perform a Bessel interpolation iteration on the touch point coordinates of N+1 data frames including the current data frame with the touch point coordinates of the N+1 data frames as initial iteration values; and acquire an iteration result of the Bessel interpolation iteration, and implementing coordinate smoothing according to the iteration result.

In an optional embodiment, the program 610 is further configured to enable the processor 602 to: when performing a Bessel interpolation iteration on the touch point coordinates of N+1 data frames including the current data frame with the touch point coordinates of the N+1 data frames as the initial iteration values, perform, according to a time sequence of the N+1 data frames, the Bessel interpolation iteration in sequence for the touch point coordinates of the N+1 data frames; acquire, according to the Bessel interpolation result, a plurality of touch point coordinates having a first time series relationship that are generated by the Bessel interpolation; and continue the Bessel interpolation iteration on the plurality of generated touch point coordinates until an iteration termination condition is satisfied.

In an optional embodiment, the program 610 is further configured to enable the processor 602 to: when continuing the Bessel interpolation iteration on the plurality of generated touch point coordinates until the iteration termination condition is satisfied, with respect to each of the touch point coordinates of the current data frame, perform the Bessel interpolation for the touch point coordinates in sequence according to the first time series relationship between the corresponding plurality of touch point coordinates; acquire, according to the first time series relationship and the Bessel interpolation result, at least one touch point coordinate having a second time series relationship that is generated by the Bessel interpolation; determine whether a number of touch point coordinates having the second time series relationship is 1; when the number is 1, terminate the Bessel interpolation iteration; and with the number is not 1, update a plurality of touch point coordinates corresponding to current touch point coordinates with the touch point coordinates having the second time series relationship, update the first time series relationship with the second time series relationship, and return to continue the step of performing the Bessel interpolation for the touch point coordinates in sequence according to the first time series relationship between the corresponding plurality of touch point coordinates.

In an optional embodiment, the Bessel interpolation iteration includes a linear Bessel interpolation iteration.

In an optional embodiment, the program 610 is further configured to enable the processor 602 to: when performing the Bessel interpolation iteration on the touch point coordinates of the N+1 data frames, by using the touch point coordinates of the N+1 data frames including the current data frame as the initial iteration values, perform a Bessel interpolation iteration for a horizontal coordinate on horizontal coordinates of the touch point coordinates of the N+1 data frames and a Bessel interpolation iteration for a vertical coordinate on vertical coordinates of the touch point coordinates of the N+1 data frames respectively in units of two adjacent frames in the N+1 data frames.

In an optional embodiment, the program 610 is further configured to enable the processor 602 to: when acquiring the iteration result of the Bessel interpolation iteration, and implementing coordinate smoothing according to the iteration result, acquire the iteration result of the Bessel interpolation iteration, and determine whether a difference between the iteration result and the touch point coordinates of the current data frame is greater than a first predetermined threshold; and when the difference is greater than the first predetermined threshold, decrease a Bessel interpolation coefficient, and perform the Bessel interpolation iteration again for the touch point coordinates of the N+1 data frames by using the decreased Bessel interpolation coefficient, until the difference between the iteration result and the touch point coordinates of the current data frame is less than the first predetermined threshold or satisfies a down-shift termination condition of the Bessel interpolation coefficient; or when the difference is not greater than the first predetermined threshold, increase the Bessel interpolation coefficient, and perform the Bessel interpolation iteration again for the touch point coordinates of the N+1 data frames by using the increased Bessel interpolation coefficient, until the difference between the iteration result and the touch point coordinates of the current data frame is greater than a second predetermined threshold predetermined threshold or satisfies an up-shift termination condition of the Bessel interpolation coefficient.

In an optional embodiment, the down-shift termination condition of the Bessel interpolation coefficient includes: a decrease of the Bessel interpolation coefficient reaching a predetermined decrease upper limit, or the Bessel interpolation coefficient reaching a predetermined lower limit; and/or the up-shift termination condition of the Bessel interpolation coefficient includes: an increase of the Bessel interpolation coefficient reaching a predetermined increase upper limit, or the Bessel interpolation coefficient reaching a predetermined upper limit.

In an optional embodiment, the first predetermined threshold is 3 mm, and the second predetermined threshold is 2 mm.

In an optional embodiment, the program 610 is further configured to enable the processor 602 to: when acquiring the iteration result of the Bessel interpolation iteration, and implementing coordinate smoothing according to the iteration result, update the touch point coordinates of the current data frame with the iteration result of the Bessel interpolation iteration to implement coordinate smoothing.

In an optional embodiment, N is a natural number between 5 and 80.

The practice of various steps in the program 610 may be referenced to the description of related steps and units in the above embodiments of the method for smoothing coordinates. A person skilled in the art would clearly acknowledge that for ease and brevity of description, the specific operation processes of the above described devices and modules may be referenced to the relevant portions in the above described method embodiments, which are thus not described herein any further.

By the touch chip according to this embodiment, during smoothing coordinates on the touch screen, on the basis of touch point coordinates of a current data frame and N history data frames contiguous to the current data frame, new touch point coordinates of the current data frame are finally generated by a Bessel interpolation iteration on the touch point coordinates, such that the coordinates are smoothed. In the process of a complete Bessel interpolation iteration, Bessel interpolation coefficients are the same. Compared with the conventional way of smoothing coordinates by weighted averaging, in one aspect, setting of a weighting coefficient is simplified, and the implementation cost of smoothing the coordinates is lowered; in another aspect, by the Bessel interpolation iteration on the touch point coordinates of a plurality of data frames, an iteration result is objective and accurate, coordinate jitters and handwriting drifts are effectively mitigated, and thus the effect of smoothing the coordinate is improved; and in still another aspect, if the effect of smoothing coordinates needs to be adjusted, one Bessel interpolation coefficient only needs to be adjusted, with no need to adjust a plurality of coefficients, such that the speed and efficiency of improving the effect of smoothing coordinates are improved.

An embodiment of the present disclosure further provides an electronic terminal. The electronic terminal includes the touch chip as described in the fourth embodiment, the fifth embodiment, or the sixth embodiment.

The described apparatus embodiment is merely exemplary. The modules described as separate parts may or may not be physically separated, and parts shown as modules may or may not be physical modules, which may be located in one position, or may be distributed on multiple network modules. A part or all of the modules may be selected according to the actual needs to achieve the objectives of the technical solutions of the embodiments. Persons of ordinary skill in the art may understand and practice the present disclosure without paying any creative effort.

As can be known from the description of the above embodiments, persons skilled in the art may clearly understand that the embodiments may be practiced by using software plus a necessary universal hardware platform or may certainly be implemented by using hardware. Based on such understanding, portions of the technical solutions of the present disclosure that essentially contribute to the related art may be embodied in the form of a software product, the computer software product may be stored in a computer readable storage medium. The computer-readable storage medium includes any mechanism for storing or transferring information in a computer readable form. For example, the computer-readable medium includes a read-only memory (ROM), a random access memory (RAM), a disk storage medium, an optical storage medium, a flash storage medium, electricity, light, sound and other forms of propagation signals (for example, a carrier, an infrared signal, a digital signal and the like) and the like. The computer software product includes several instructions for instructing a computer device (which may be a personal computer, a server or a network device) to perform all the embodiments or some parts of the embodiments.

Finally, it should be noted that the above embodiments are merely intended to describe the technical solutions of the embodiments of the present disclosure, instead of limiting the present disclosure. Although the present disclosure is described in detail with reference to the above embodiments, persons of ordinary skill in the art should understand that various modifications may be made to the technical solutions described in the above embodiments or equivalent replacements may be made to some technical features thereof, without departing from the spirit and scope of the technical solutions of the embodiments of the present disclosure.

What is claimed is:

1. A method for smoothing touch point coordinates of an object on a touch screen, comprising:
acquiring touch point coordinates of a current data frame on the touch screen, and touch point coordinates of N consecutive data frames prior to the current data frame, the N being a natural number greater than or equal to 2;
performing a Bessel interpolation iteration on touch point coordinates of including the current data frame and the N consecutive data frames with the touch point coordinates of the N+1 data frames as initial iteration values; and
acquiring an iteration result of the Bessel interpolation iteration, and implementing coordinate smoothing according to the iteration result,
wherein the acquiring an iteration result of the Bessel interpolation iteration and implementing coordinate smoothing according to the iteration result further comprises:
(a) acquiring the iteration result of the Bessel interpolation iteration, and determining whether a difference between the iteration result and the touch point coordinates of the current data frame is greater than a first predetermined threshold;
(b1) when the difference is greater than the first predetermined threshold, decreasing a Bessel interpolation coefficient, and performing the Bessel interpolation iteration again on the touch point coordinates of the N+1 data frames by using the decreased Bessel interpolation coefficient, until the difference between the iteration result and the touch point coordinates of the current data frame is less than the first predetermined threshold or satisfies a down-shift termination condition of the Bessel interpolation coefficient, or
(b2) when the difference is not greater than the first predetermined threshold, increasing the Bessel interpolation coefficient, and performing the Bessel interpolation iteration again on the touch point coordinates of the N+1 data frames by using the increased Bessel interpolation coefficient, until the difference between the iteration result and the touch point coordinates of the current data frame is greater than a second predetermined threshold predetermined threshold or satisfies an up-shift termination condition of the Bessel interpolation coefficient; and
(c) updating the touch point coordinates of the current data frame with the iteration result of the Bessel interpolation iteration to implement coordinate smoothing for determining a touch position of the object on the touch screen.

2. The method according to claim 1, wherein the performing a Bessel interpolation iteration on the touch point coordinates of including the current data frame and the N consecutive data frames with the touch point coordinates of the N+1 data frames as initial iteration values comprises:
performing, according to a time sequence of the N+1 data frames, the Bessel interpolation iteration in sequence on the touch point coordinates corresponding to the N+1 data frames to obtain a Bessel interpolation result;
acquiring, according to the Bessel interpolation result, a plurality of touch point coordinates having a first time series relationship that are generated by the Bessel interpolation; and
continuing the Bessel interpolation iteration on the plurality of generated touch point coordinates until an iteration termination condition is satisfied.

3. The method according to claim 2, wherein the continuing the Bessel interpolation iteration on the plurality of generated touch point coordinates until an iteration termination condition is satisfied comprises:
with respect to each of the touch point coordinates of the current data frame, performing the Bessel interpolation for the touch point coordinates in sequence according to the first time series relationship between the corresponding plurality of touch point coordinates;
acquiring, according to the first time series relationship and the Bessel interpolation result, at least one touch point coordinate having a second time series relationship that is generated by the Bessel interpolation;
determining whether a number of the touch point coordinates having the second time series relationship is 1;
when the number is 1, terminating the Bessel interpolation iteration; and
when the number is not 1, updating a plurality of touch point coordinates corresponding to current touch point coordinates with the touch point coordinates having the second time series relationship, updating the first time series relationship with the second time series relationship, and returning to continue the step of performing the Bessel interpolation for the touch point coordinates in sequence according to the first time series relationship between the corresponding plurality of touch point coordinates.

4. The method according to claim 1, wherein the Bessel interpolation iteration comprises a Bessel linear interpolation iteration.

5. The method according to claim 1, wherein the performing a Bessel interpolation iteration on the touch point coordinates of N+1 data frames comprises:
performing a Bessel interpolation iteration for horizontal coordinate on horizontal coordinates of the touch point coordinates of the N+1 data frames, and a Bessel interpolation iteration for a vertical coordinate on vertical coordinates of the N+1 data frames respectively in units of two adjacent frames in the N+1 data frames.

6. The method according to claim 1,
wherein the down-shift termination condition of the Bessel interpolation coefficient comprises: a decrease of the Bessel interpolation coefficient reaching a predetermined decrease upper limit or the Bessel interpolation coefficient reaching a predetermined lower limit, or the up-shift termination condition of the Bessel interpolation coefficient comprises: an increase of the Bessel interpolation coefficient reaching a predetermined increase upper limit, or the Bessel interpolation coefficient reaching a predetermined upper limit.

7. The method according to claim 6, wherein the first predetermined threshold is 3 mm, and the second predetermined threshold is 2 mm.

8. The method according to claim 1, wherein the N is a natural number between 5 and 80.

9. A touch chip, comprising: a processor, a memory, a communication interface, and a communication bus; wherein the processor, the memory, and the communication interface are in communication with each other via the communication bus;
wherein the memory is configured to store at least one executable instruction, which, when executed by the processor, enables the processor to perform operations corresponding to the method for smoothing touch point coordinates of an object on a touch screen, wherein the method for smoothing coordinates comprising:
acquiring touch point coordinates of a current data frame on a touch screen, and touch point coordinates of N consecutive data frames prior to the current data frame, the N being a natural number greater than or equal to 2;
performing a Bessel interpolation iteration on touch point coordinates of including the current data frame and the N consecutive data frames with the touch point coordinates of the N+1 data frames as initial iteration values; and
acquiring an iteration result of the Bessel interpolation iteration, and implementing coordinate smoothing according to the iteration result,
wherein the acquiring an iteration result of the Bessel interpolation iteration and implementing coordinate smoothing according to the iteration result further comprises:
(a) acquiring the iteration result of the Bessel interpolation iteration, and determining whether a difference between the iteration result and the touch point coordinates of the current data frame is greater than a first predetermined threshold;
(b1) when the difference is greater than the first predetermined threshold, decreasing a Bessel interpolation coefficient, and performing the Bessel interpolation iteration again on the touch point coordinates of the N+1 data frames by using the decreased Bessel interpolation coefficient, until the difference between the iteration result and the touch point coordinates of the current data frame is less than the first predetermined threshold or satisfies a down-shift termination condition of the Bessel interpolation coefficient, or
(b2) when the difference is not greater than the first predetermined threshold, increasing the Bessel interpolation coefficient, and performing the Bessel interpolation iteration again on the touch point coordinates of the N+1 data frames by using the increased Bessel interpolation coefficient, until the difference between the iteration result and the touch point coordinates of the current data frame is greater than a second predetermined threshold predetermined threshold or satisfies an up-shift termination condition of the Bessel interpolation coefficient; and
(c) updating the touch point coordinates of the current data frame with the iteration result of the Bessel interpolation iteration to implement coordinate smoothing for determining a touch position of the object on the touch screen.

10. The touch chip according to claim 9, wherein the performing a Bessel interpolation iteration on the touch point coordinates of including the current data frame and the N consecutive data frames with the touch point coordinates of the N+1 data frames as initial iteration values comprises:
performing, according to a time sequence of the N+1 data frames, the Bessel interpolation iteration in sequence on the touch point coordinates corresponding to the N+1 data frames to obtain a Bessel interpolation result;
acquiring, according to the Bessel interpolation result, a plurality of touch point coordinates having a first time series relationship that are generated by the Bessel interpolation; and
continuing the Bessel interpolation iteration on the plurality of generated touch point coordinates until an iteration termination condition is satisfied.

11. The touch chip according to claim 10, wherein the continuing the Bessel interpolation iteration on the plurality of generated touch point coordinates until an iteration termination condition is satisfied comprises:
with respect to each of the touch point coordinates of the current data frame, performing the Bessel interpolation for the touch point coordinates in sequence according to the first time series relationship between the corresponding plurality of touch point coordinates;
acquiring, according to the first time series relationship and the Bessel interpolation result, at least one touch point coordinate having a second time series relationship that is generated by the Bessel interpolation;
determining whether a number of the touch point coordinates having the second time series relationship is 1;
when the number is 1, terminating the Bessel interpolation iteration; and
when the number is not 1, updating a plurality of touch point coordinates corresponding to current touch point coordinates with the touch point coordinates having the second time series relationship, updating the first time series relationship with the second time series relationship, and returning to continue the step of performing the Bessel interpolation for the touch point coordinates in sequence according to the first time series relationship between the corresponding plurality of touch point coordinates.

12. The touch chip according to claim 9, wherein the Bessel interpolation iteration comprises a Bessel linear interpolation iteration.

13. The touch chip according to claim 9, wherein the performing a Bessel interpolation iteration on the touch point coordinates of N+1 data frames comprises:
performing a Bessel interpolation iteration for horizontal coordinate on horizontal coordinates of the touch point coordinates of the N+1 data frames, and a Bessel interpolation iteration for a vertical coordinate on vertical coordinates of the N+1 data frames respectively in units of two adjacent frames in the N+1 data frames.

14. The touch chip according to claim 9,
wherein the down-shift termination condition of the Bessel interpolation coefficient comprises: a decrease of the Bessel interpolation coefficient reaching a predetermined decrease upper limit or the Bessel interpolation coefficient reaching a predetermined lower limit, or the up-shift termination condition of the Bessel interpolation coefficient comprises: an increase of the Bessel interpolation coefficient reaching a predetermined increase upper limit, or the Bessel interpolation coefficient reaching a predetermined upper limit.

15. The touch chip according to claim 14, wherein the first predetermined threshold is 3 mm, and the second predetermined threshold is 2 mm.

16. The touch chip according to claim 9, wherein the N is a natural number between 5 and 80.

17. An electronic terminal, comprising the touch chip as defined in claim 9.

* * * * *